(12) United States Patent
Mallon et al.

(10) Patent No.: US 10,679,242 B2
(45) Date of Patent: Jun. 9, 2020

(54) METHODS AND SYSTEMS FOR CONDUCTING AD RESEARCH

(71) Applicant: IPSOS America, Inc., New York, NY (US)

(72) Inventors: Ken Mallon, Saratoga, CA (US); Jim Leonick, Los Angeles, CA (US); Ryan King, San Francisco, CA (US)

(73) Assignee: IPSOS AMERICA, INC., New York, NY (US)

( * ) Notice: Subject to any disclaimer, the term of this patent is extended or adjusted under 35 U.S.C. 154(b) by 930 days.

(21) Appl. No.: 14/167,518

(22) Filed: Jan. 29, 2014

(65) Prior Publication Data

US 2015/0213483 A1 Jul. 30, 2015

(51) Int. Cl.
*G06Q 30/02* (2012.01)
*H04L 29/08* (2006.01)

(52) U.S. Cl.
CPC ......... *G06Q 30/0245* (2013.01); *H04L 67/02* (2013.01); *H04L 67/22* (2013.01)

(58) Field of Classification Search
CPC .......... G06Q 30/0242; G06Q 30/0243; G06Q 30/0245; H04L 67/02; H04L 67/22
USPC ................ 705/14.41, 14.42, 14.44
See application file for complete search history.

(56) References Cited

U.S. PATENT DOCUMENTS

| | | | |
|---|---|---|---|
| 8,229,788 B2 | 7/2012 | Nyhan et al. | |
| 2004/0254942 A1* | 12/2004 | Error | G06F 17/3089 |
| 2006/0041480 A1* | 2/2006 | Briggs | G06Q 30/02 705/14.41 |
| 2007/0217769 A1* | 9/2007 | Super | G06Q 30/02 386/249 |
| 2007/0245249 A1* | 10/2007 | Weisberg | G06F 9/4443 715/758 |
| 2007/0260512 A1 | 11/2007 | Sattley et al. | |
| 2010/0088152 A1* | 4/2010 | Bennett | G06Q 30/02 705/14.19 |
| 2011/0087519 A1* | 4/2011 | Fordyce, III | G06Q 30/02 705/7.29 |
| 2012/0004981 A1 | 1/2012 | Bhatia et al. | |

(Continued)

FOREIGN PATENT DOCUMENTS

EP 1240611 A1 9/2002

OTHER PUBLICATIONS

How to Write Advertisements that Sell, A. W. Shaw Co., from System, the magazine of Business, dated 1912.*

(Continued)

*Primary Examiner* — Scott D Gartland
(74) *Attorney, Agent, or Firm* — Armstong Teasdale LLP

(57) ABSTRACT

A method for conducting ad research is provided. The method includes identifying a plurality of panelists, wherein each panelist has a user device, embedding a first object in digital content that will be viewed by the plurality of panelists, using the first object to place a cookie on a respective user device when each panelist views the digital content, wherein the cookie enables a server to identify the respective user device, embedding a second object in a test advertisement, serving the test advertisement to at least some of the plurality of panelists using the cookies, generating data related to the serving of the test advertisement using the second object, and collecting ad effectiveness data from the plurality of panelists regarding the test advertisement.

11 Claims, 8 Drawing Sheets

(56) References Cited

U.S. PATENT DOCUMENTS

| | | |
|---|---|---|
| 2012/0278131 A1 | 1/2012 | Jepson et al. |
| 2013/0097312 A1* | 4/2013 | Mazumdar .............. H04L 43/04 709/224 |
| 2013/0325583 A1 | 5/2013 | Arini et al. |
| 2013/0282898 A1 | 10/2013 | Kalus et al. |
| 2013/0332604 A1 | 12/2013 | Seth et al. |

OTHER PUBLICATIONS

Testing Methods, from the AdAge Encyclopedia of Advertising, no specific author listed, dated Sep. 15, 2003, downloaded from https://adage.com/article/adage-encyclopedia/testing-methods/98903/ on Jan. 11, 2019, at pp. 1-4, 6 (Year: 2003).*

History of advertising: No 161: A Starch Test score sheet, no specific author listed, downloaded from https://www.campaignlive.co.uk/article/history-advertising-no-161-starch-test-score-sheet/1381938 on Jan. 10, 2019 (Year: 2019).*

Web bug Definition from PC Magazine Encyclopedia, dated May 10, 2013, downloaded from Archive.org at https:/web.archive.org/web/20130510101756/https://www.pcmg.com/encyclopedia/term/54280/web-bug on Jan. 10, 2019 (Year: 2013).*

Olsen, Stephanie, CNET, Nearly undetectable tracking device raises concern, dated Jan. 2, 2002, downloaded from https://www.cnet.com/news/nearly-undetectable-tracking-device-raises/concern/ on Jan. 10, 2019 (Year: 2002).*

Bennett, Colin, Cookies Web bugs Webcams and Cue Cats—Patterns of Surveilance on the WWW—Ethics and Information Technology 2001 (Year: 2001).*

ISR/WO for PCT/US2015/012428.

European Supplementary Search Report, Application No. 15743579.3, dated Jul. 17, 2017, 2 pps.

* cited by examiner

METHODS AND SYSTEMS FOR CONDUCTING AD RESEARCH

BACKGROUND OF THE INVENTION

The field of the present disclosure relates to ad research and, more particularly, to computer-based methods and systems for serving test advertisements to a plurality of panelists and collecting data from the panelists regarding the test advertisements.

Ad servers disseminate advertisements to consumers through personal computer, mobile devices, tablets, and other computing devices. These advertisements may be served through a browser, within applications ("apps") running on the computing device, etc. The advertisements are used as digital marketing to promote products and/or services to consumers.

The content of ad servers may be constantly updated so that the website or app on which the ads are displayed contains new advertisements—e.g., banners (static images/animations), videos or text—when the site or page is visited or refreshed by a user. The purpose of ad serving is to deliver targeted ads that match the visitor's interests, geography, demographics or other characteristics, or to simply reach a desired number of consumers regardless of their attributes. To generate advertisements that generate awareness, interest, or purchase intent in a product and/or service, ad research is conducted to determine the efficacy of an advertisement.

Ad research may be conducted using pre-testing or in-market evaluation. In pre-testing, advertisers test ads prior to launching an ad campaign in order to estimate which ads are likely to be effective and to receive feedback that can be used to improve the ads. However, this pre-testing is often done in a lab environment in which individuals exposed to ads know they are part of the research. This makes it difficult to replicate the exposure context and mindset of a consumer naturally being exposed to advertisements. In-market evaluation refers to measuring the impact of advertisements during a campaign or after the ad campaign has been completed. However, in at least some known in-market evaluation methods, advertisements are served to individuals about which little, if anything, is known. This makes it difficult to generate research results for a particular demographic (age, gender, occupation, geographic location, etc.) to which the advertisements are targeted. In addition, smaller ad campaigns often do not reach enough people willing to provide data about their advertising effects.

BRIEF DESCRIPTION OF THE INVENTION

In one embodiment, a method for conducting ad research is provided. The method includes identifying a plurality of panelists, wherein each panelist has a user device, embedding a first object in digital content that will be viewed by the plurality of panelists, using the first object to place a cookie on a respective user device when each panelist views the digital content, wherein the cookie enables a server to identify the respective user device, embedding a second object in a test advertisement, serving the test advertisement to at least some of the plurality of panelists using the cookies, generating data related to the serving of the test advertisement using the second object, and collecting ad effectiveness data from the plurality of panelists regarding the test advertisement.

In another embodiment, a method for conducting ad research is provided. The method includes placing a cookie on a user device of a predetermined panelist, serving a test advertisement to the predetermined panelist using the cookie, wherein an object is embedded in the test advertisement, generating data related to the serving of the test advertisement using the object, and collecting ad effectiveness data from the predetermined panelist regarding the test advertisement.

In yet another embodiment, a web server is provided. The web server is configured to cause a first object to be embedded in digital content that will be viewed by a plurality of panelists, wherein each panelist has a user device, cause a cookie to be placed on a respective user device when each panelist views the digital content, identify the respective user devices using the cookies, cause a second object to be embedded in a test advertisement, serve the test advertisement to at least some of the plurality of panelists using the cookies, and generate data related to the serving of the test advertisement using the second object.

BRIEF DESCRIPTION OF THE DRAWINGS

FIG. 1 is a simplified block diagram of an example embodiment of an ad research system in accordance with one embodiment of the present invention.

FIG. 2 is an expanded block diagram of an example embodiment of a server architecture of an ad research system in accordance with one embodiment of the present invention.

FIG. 3 is a block diagram of an example embodiment of a user computer device as shown in FIGS. 1 and 2.

FIG. 4 is a block diagram of an example embodiment of a server computer device as shown in FIGS. 1 and 2.

FIG. 5 is a flow chart of an exemplary method for conducting ad research for a test advertisement.

FIG. 6 is a flow diagram of an exemplary method for surveying panelists that may be used with the method shown in FIG. 5.

FIG. 7 is a flow diagram of an exemplary method for serving advertisements to a panelist that may be used with the method shown in FIG. 5.

FIG. 8 is a flow diagram of an exemplary method for serving surveying panelists after serving advertisements to the panelists that may be used with the method shown in FIG. 5.

DETAILED DESCRIPTION OF THE INVENTION

The methods and systems described herein relate to an ad research system that is configured to serve a test advertisement to a plurality of panelists. The panelists are identified before the test advertisement is served. Cookies placed in on user devices and objects embedded in the test advertisement are used to track the panelists' exposure to the test advertisement. Ad effectiveness data (e.g., survey data) is collected to evaluate the panelists' exposure to the test advertisement.

In one example embodiment, a computer program is provided, and the program is embodied on a computer readable medium. In another example embodiment, the system is executed on a single computer system with a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

Figure 1:
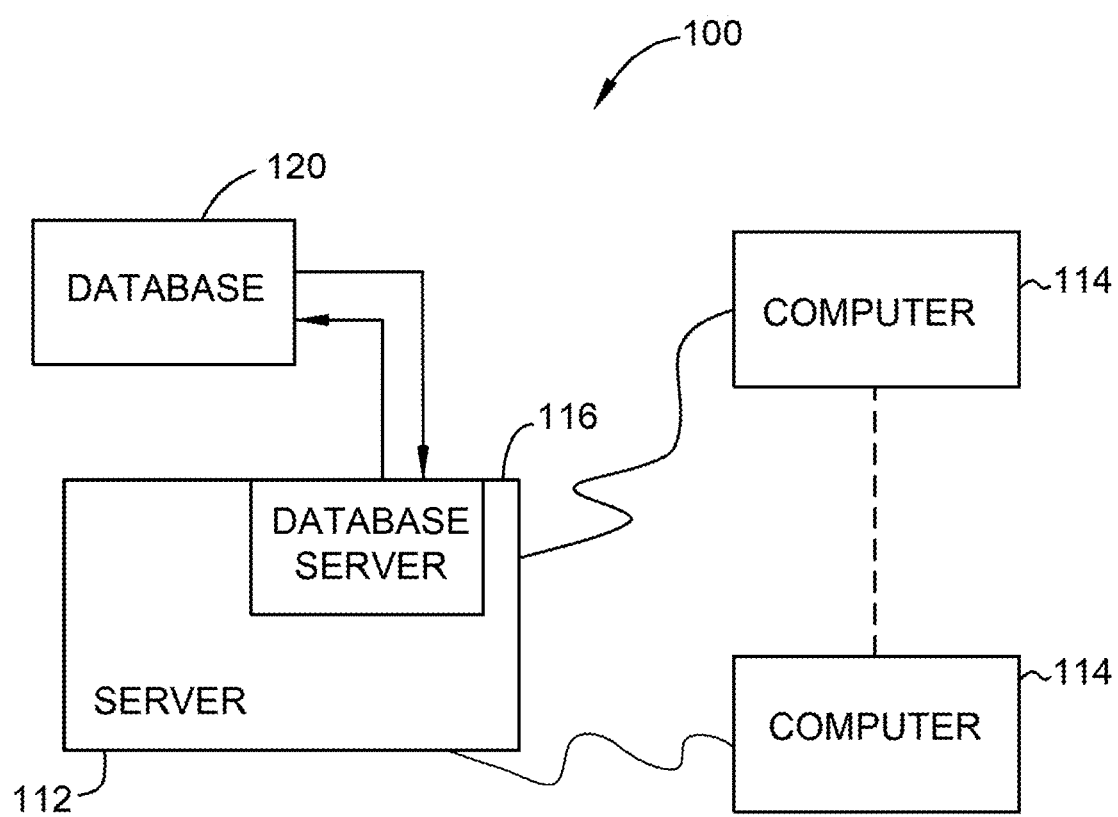
FIGS. 1-8 show example embodiments of the methods and systems described herein.

FIG. 1 is a simplified block diagram of an example embodiment of an ad research system 100 in accordance with one embodiment of the present invention. In the example embodiment, computing system 100 is configured to facilitate conducting ad research by presenting one or more test advertisements to a plurality of panelists, as described in detail herein.

More specifically, in the example embodiment, computer system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment. Server system 112 may be associated with any company having computer assets capable of serving test advertisements to panelists and evaluating exposure of the panelists to the test advertisements.

A database server 116 is connected to database 120, which contains information on a variety of matters, as described below in greater detail. In the example embodiment, database 120 is a non-centralized database stored remotely from server system 112, and can be accessed by potential users at one of client systems 114 by logging onto server system 112 through one of client systems 114.

In the example embodiment, each client system 114 is associated with a user and may be referred to as a user computer device 114. In one embodiment, user computer device 114 is a computer including a web browser, such that server system 112 is accessible to user computer device 114 using the Internet. User computer device 114 is interconnected to the Internet through many interfaces including a network, such as a local area network (LAN) or a wide area network (WAN), dial-in-connections, cable modems, and special high-speed ISDN lines. User computer device 114 may also include a remote computing device, such as a web-based phone, smartphone, mobile phone, personal digital assistant (PDA), tablet device, iPhone® (iPhone is a registered trademark of Apple, Incorporated located in Cupertino, Calif.), Android® (Android is a registered trademark of Google Incorporated, located in Mountain View, Calif.), and/or any device capable of executing stored computer-readable instructions. User computer device 114 is configured to communicate with other user computer devices 114 within system 100.

Figure 2:
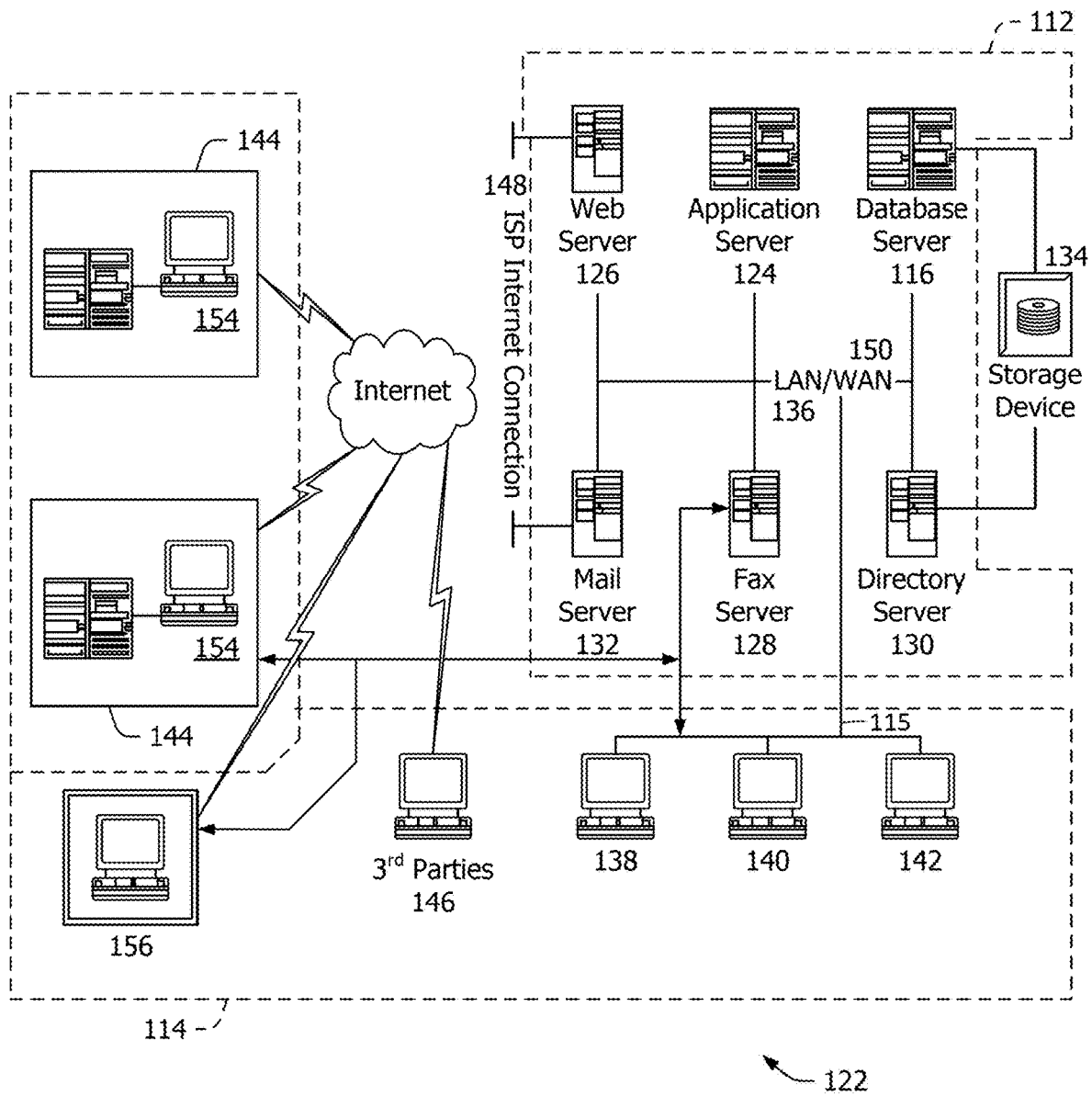

FIG. 2 is an expanded block diagram of a server architecture of an ad research system 122 including other computing devices in accordance with one embodiment of the present invention. Components in system 122, identical to components of system 100 (shown in FIG. 1), are identified in FIG. 2 using the same reference numerals as used in FIG. 1. System 122 includes server system 112 and client systems 114. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer or a virtualized personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties 146 using an ISP Internet connection 148. The communication in the example embodiment is illustrated as being performed using the Internet, however, any other wide area network (WAN) type communication can be utilized in other embodiments (e.g., the systems and processes are not limited to being practiced using the Internet). In addition, and rather than WAN 150, local area network 136 could be used in place of WAN 150.

In the example embodiment, any authorized individual having a physical or virtualized workstation 154 can access system 122. At least one of the client systems includes a manager workstation 156 located at a remote location. Workstations 154 and 156 are personal computers or virtualized personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

In the example embodiment, web server 126 is an ad server. An ad server is a computer server, such as web server 126, that stores advertisements used in digital marketing and delivers them to website visitors, mobile website visitors, mobile app user, etc. The content of the ad server may be constantly updated so that the website or app on which the ads are displayed contains new advertisements—e.g., banners (static images/animations), videos or text—when the site or page is visited or refreshed by a user. The purpose of ad serving is to deliver targeted ads that match the visitor's interests, geography, demographics or other characteristics. To facilitate conducting ad research, web server 126 serves test advertisements to panelists, as described in detail herein.

Ad servers can be run locally, by third-parties, and/or remotely. Local ad servers are typically run by a single publisher (i.e., a content creator or distributor) and serve ads to that publisher's domains, allowing fine-grained creative, formatting, and content control by that publisher. Remote ad servers can serve ads across domains owned by multiple publishers. Remote ad servers typically deliver ads from one central source so that advertisers and publishers can track the distribution of their online advertisements. That is, remote ad servers typically have one location for controlling the rotation and distribution of the advertisements across the web.

Ad servers are increasingly being used not just for web-based ad serving, and may be used for serving ads on mobile devices, either through a browser on the mobile device, within applications ("apps") running on the mobile device, or in marketing messages delivered via text messages (e.g., SMS messages). Further, as televisions become increasingly Internet enabled, advertisements may be served through televisions, targeting households and/or individuals with specific characteristics.

Figure 3:
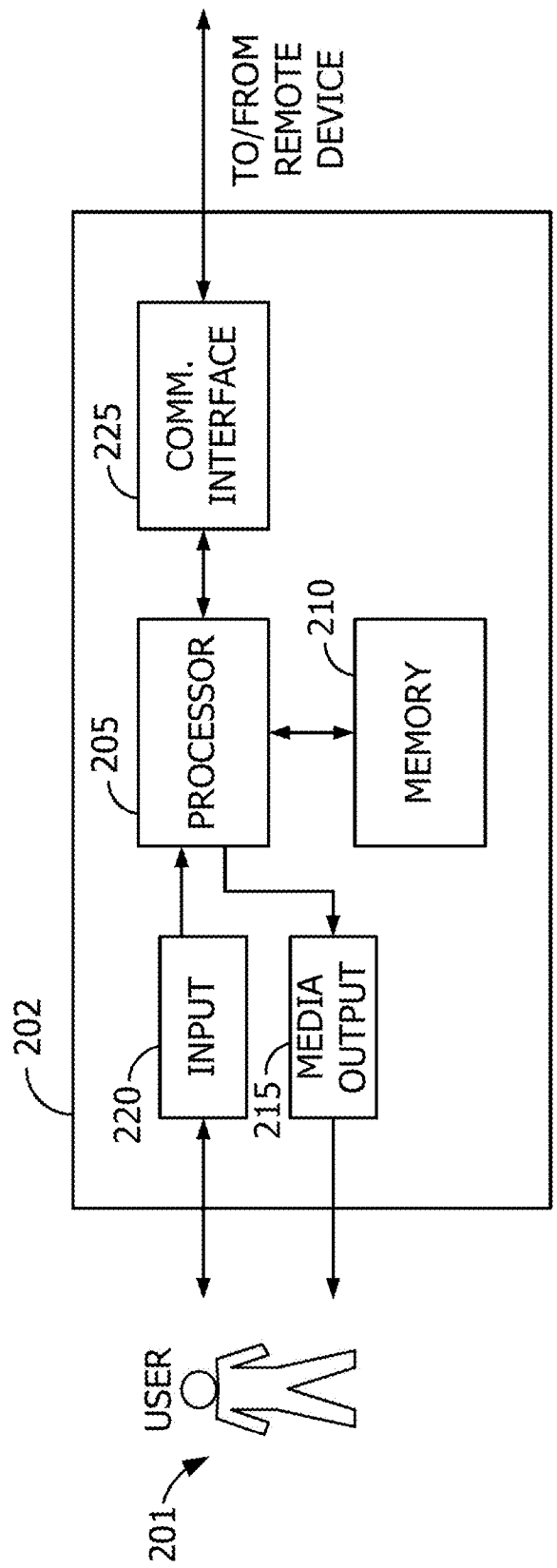

FIG. 3 illustrates an exemplary configuration of a user computer device 202 operated by a user 201. User computer device 202 may include, but is not limited to, client systems 114, 138, 140, and 142, 146, workstation 154, and manager workstation 156 (all shown in FIG. 2).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

User computer device 202 also includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which can be communicatively coupled to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112 (shown in FIGS. 1 and 2). A client application allows user 201 to interact with a server application from server system 112.

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
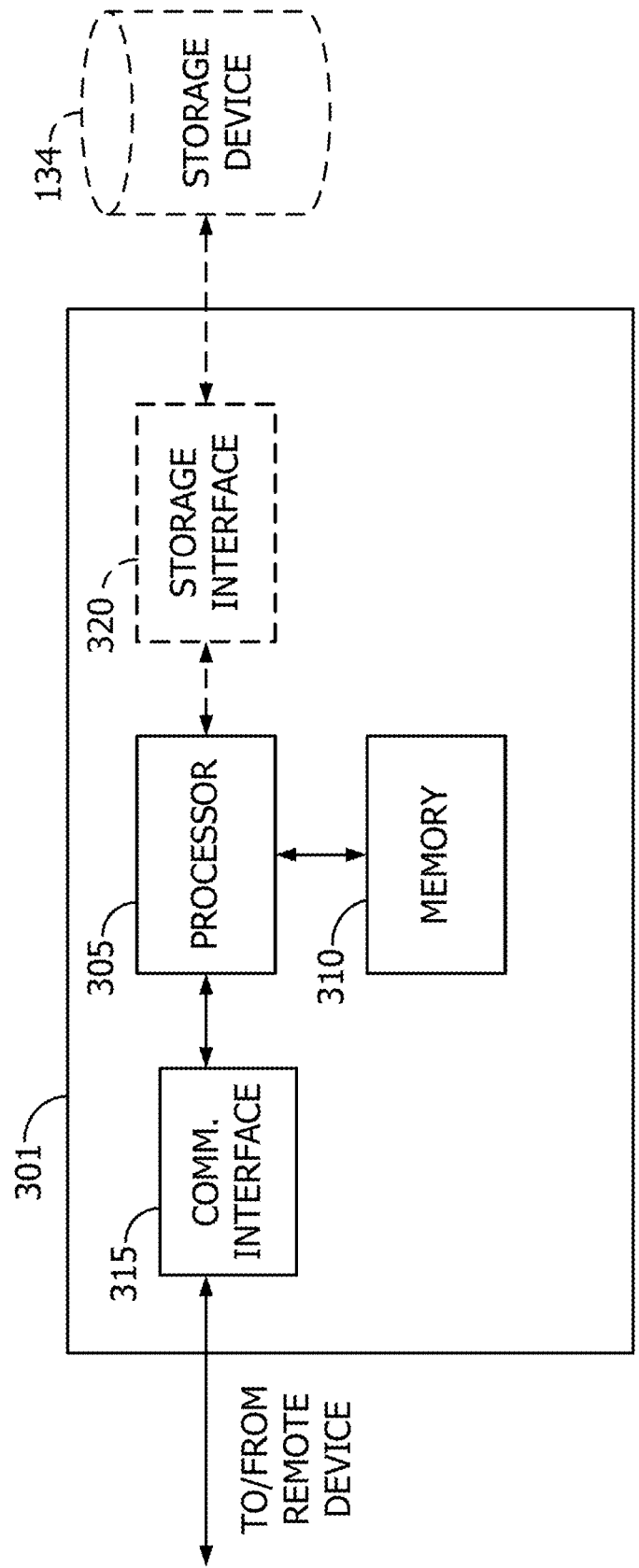

FIG. 4 illustrates an example configuration of a server system 301, such as server system 112 (shown in FIGS. 1 and 2). Server system 301 may include, but is not limited to, database server 116 (shown in FIGS. 1 and 2), application server 124, web server 126, fax server 128, directory server 130, and mail server 132 (all shown in FIG. 2).

Server system 301 includes a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as user computer device 114 (shown in FIGS. 1 and 2), user computer device 202 (shown in FIG. 3), or another server system 301. For example, communication interface 315 may receive requests from user computer device 114 via the Internet, as illustrated in FIGS. 1 and 2.

Processor 305 may also be operatively coupled to a storage device 134 (shown in FIG. 2). Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
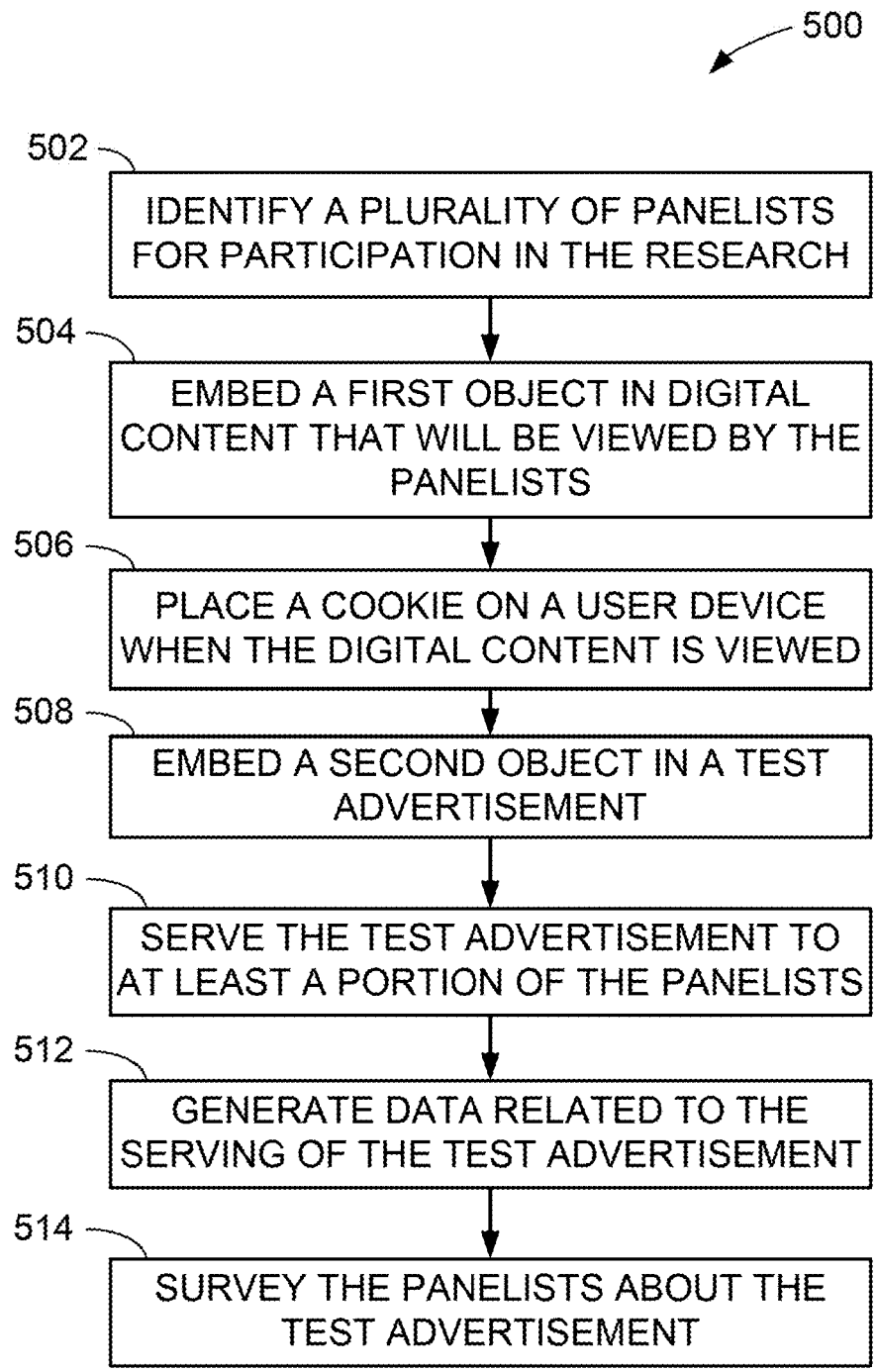

FIG. 5 is a flowchart of an exemplary method 500 for conducting ad research for a test advertisement. Method 500 may be implemented, for example, using ad research system 100 and/or system 122. A plurality of panelists are initially identified 502 for participation in the research. The panelists may include, for example, user 201 (shown in FIG. 3). The panelists may be selected from individuals who agree to participate in the research (e.g., by agreeing to terms of a user agreement). The panelists may also be selected based on their demographic information (e.g., age, gender, occupation, geographic location, etc.). That is, the test advertisement to be researched may be targeted towards a particular demographic, and accordingly, it may be desirable to present the test advertisement to panelists that fit that demographic. As panelists are identified 502 before conducting the research, the test advertisement is not presented to a group of random individuals about whom nothing is known. Instead, the test advertisement is presented to consenting panelists about whom at least some information (e.g., demographic information) is known.

To facilitate serving the test advertisement and tracking the panelists, a first object is embedded 504 in digital content that will be viewed by the panelists. For example, the first object may be embedded 504 in an email sent to the panelists, in a website frequently accessed by the panelists (e.g., a login screen), in an application used by the panelists, in a text message sent to the panelists, etc.

In the example embodiment, the first object is a web bug (also referred to as a web beacon, a tracking bug, tracking code, a tag or a page tag). The web bug may be a relatively small (e.g., one pixel) GIF or PNG image embedded 504 in digital content such as an HTML page (i.e., a webpage) or an email. The web bug may also be implemented using HTML IFrame, style, script, input link, embed, object, and/or other tags. The web bug may be computer code obtained from an ad serving company. As with other files transferred using hypertext transfer protocol, web bugs are requested by sending a server their URL, and possible the URL of the digital content in which they are embedded 504. Both URLs contain information that can be useful for tracking panelists who view the web bug. Although a web bug is embedded 504 in the example embodiment, alternatively, other objects may be used to facilitate serving test advertisements and tracking panelists as described herein.

In some embodiments, the first object is transparent or matches the color of a background image in which it is embedded 504. Alternatively, the first object may be any element used for tracking and serving advertisements as described herein. Using the first object, browsing habits of the panelists may be tracked, as described herein.

Each identified 502 panelist uses an associated user device to view and navigate webpages and/or emails that may include the digital content with the embedded 504 first object. The user device may include, for example, user computer device 202 (shown in FIG. 3). When a panelist accesses the digital content that includes the first object, the first object causes a cookie to be placed 506 on the user device. As used herein, a 'cookie' (also referred to as an HTTP cookie, a web cookie, or a browser cookie) is a piece of data that is sent to the associated user device and stored in the user's web browser. Downloading the cookie to the web browser on the user device requires the web browser to request the cookie from a server storing the cookie, such as web server 126 (shown in FIG. 2). Accordingly, the server is informed that the first object has been viewed. When the web browser requests the cookie, the server records the download event, and an organization operating the server is informed that the cookie was downloaded. The cookie facilitates serving test advertisements and tracking panelists as described herein.

A second object (e.g., a second web bug) is embedded 508 in the test advertisement that is to be researched using the panelists. The test advertisement with the embedded 508 second object is stored on an ad server, such as web server 126 (shown in FIG. 2). When a panelist uses the associated user device to access a website with an ad space, the ad server serves advertisements to be displayed to the panelist in the ad space. The ad server recognizes the panelist user device based on the cookie placed 506 in the panelist's web browser, and serves advertisements accordingly. Specifically, the test advertisement with the embedded 508 second object is served 510 to at least a portion of the panelists. In the example embodiment, for experimental design purposes, the test advertisement is served 510 to some of the panelists, and a control advertisement is served to the remaining panelists. For example, the test advertisement may be served 510 to randomly selected panelists, or may be served to a predetermined percentage of the panelists.

The second object embedded 508 in the test advertisement is used to generate 512 data related to the serving 510 of the test advertisement. For example, using the second object, the time at which the test advertisement is served 510 to the panelist, the number of times the test advertisement is served 510 to the panelist, and/or the websites at which the test advertisement is served 510 can all be tracked. Other metrics may also be tracked. For example e-commerce activities of panelists can be tracked by serving the test advertisement to panelists on an order confirmation page. The generated 512 data can be stored in a database, such as database 120 (shown in FIG. 1).

After the test advertisement has been served 510 to at least some of the panelists, the panelists are surveyed 514 about the test advertisement. That is, in the exemplary method, panelists are surveyed 514 to collect ad effectiveness data. Alternatively or additionally, ad effectiveness data may include other data (i.e., besides survey data) indicative of behaviors related to ad effects. For example, ad effectiveness data may include survey data, data related to searches performed by panelists, websites visited by panelists, content consumed by panelists, products and/or services purchased by panelists, etc. For surveys, the panelists may be asked, for example, whether they found the test advertisement effective, how the test advertisement compared to other ads, etc. Because the panelists were initially identified 502 for participation in the research, the panelists may be more willing and/or receptive than randomly selected individuals to being surveyed 514 regarding the test advertisement. In addition to survey data, these panelists may be willing to allow other data to be collected, such as their online purchase behavior, searches, website visits, or other behaviors that may be indicative of ad effects.

Figure 6:
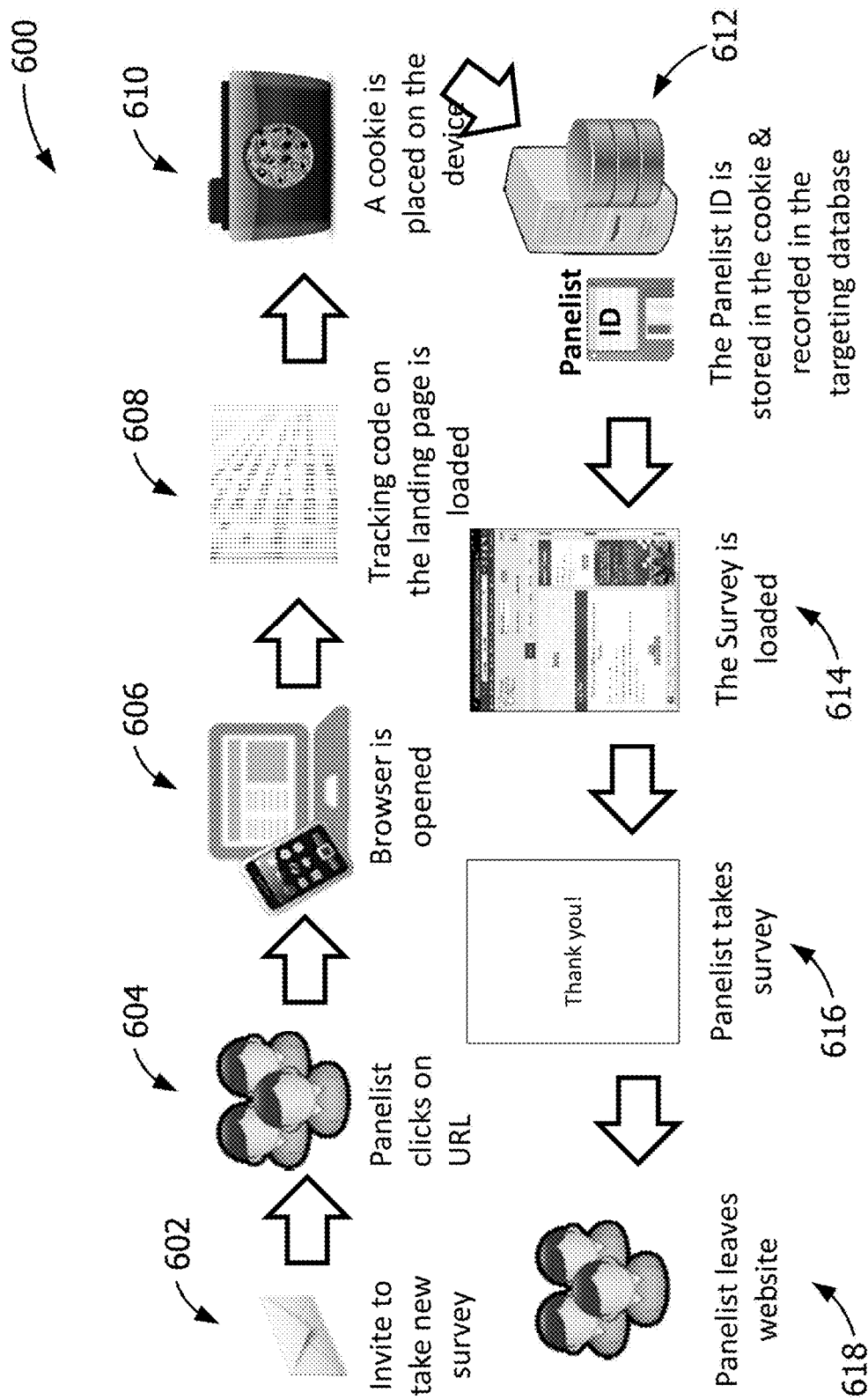

FIG. 6 is a flow diagram of an exemplary method 600 for surveying panelists. Initially, the panelists are invited 602 to participate in a new survey. Using an associated user device, such as user computer device 202 (shown in FIG. 3), each panelists clicks 604 on a URL provided in the invitation. Clicking 604 on the URL causes a web browser to open 606 to a landing page on the associated user device. An object (e.g., a web bug) is embedded, or loaded 608 on the landing page, causing a cookie to be placed 610 on the associated user device when the panelist views the landing page. A panelist ID (e.g., an alphanumeric string) that is unique to the associated user device is stored 612 in the cookie. The panelist ID is also recorded in a targeting database, such as database 120 (shown in FIG. 1). The survey is loaded 614, and the panelist takes 616 the survey. The answers that the panelist provides to the survey are stored in the targeting database, and associated with the panelist ID. After completing the survey, the panelist leaves 618 the website that included the survey.

Figure 7:
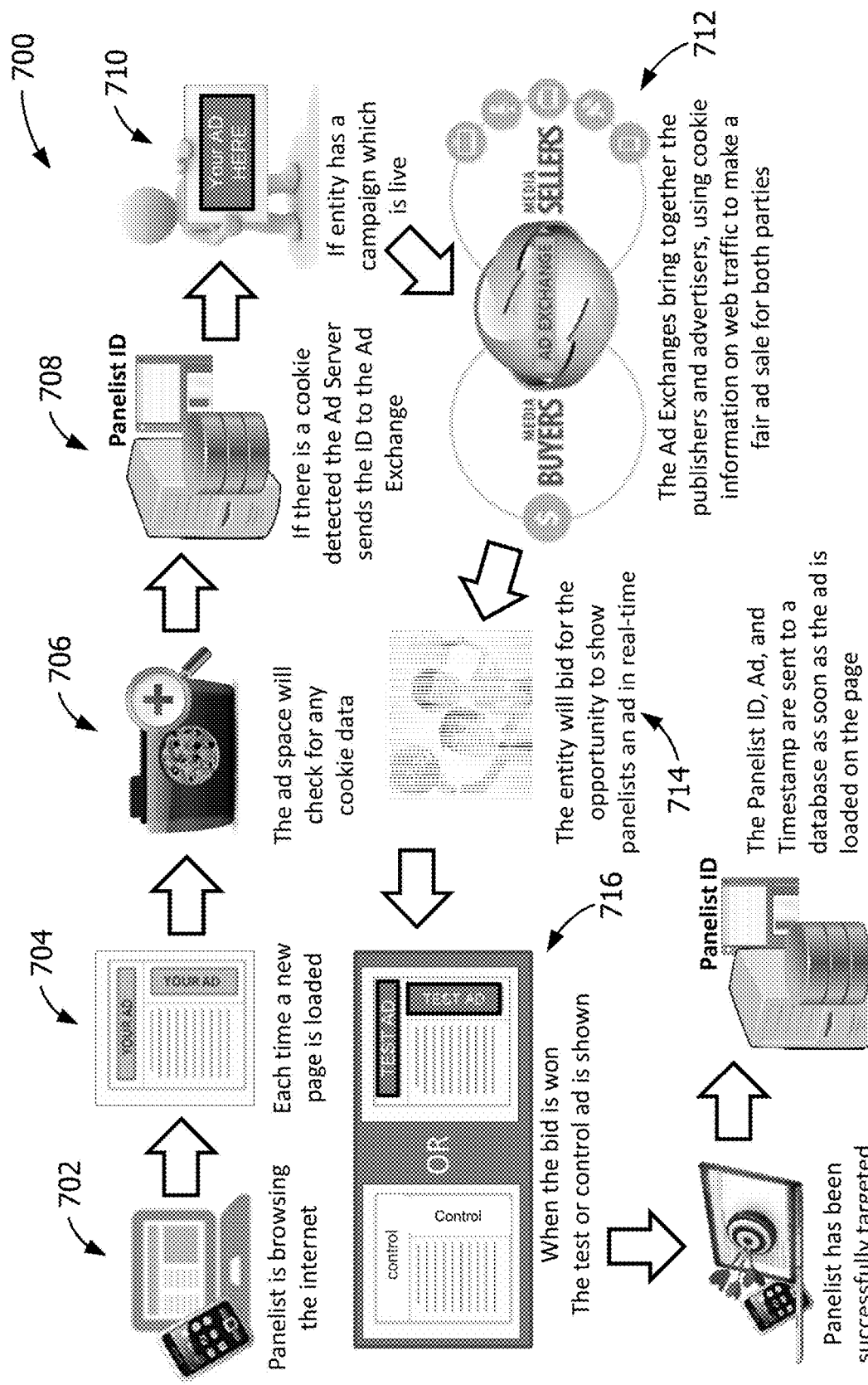

FIG. 7 is a flow diagram of an exemplary method 700 for serving advertisements to a panelist. The panelist browses the Internet 702 using an associated user device, such as user computer device 202 (shown in FIG. 3). As a new web page is loaded 704, an ad space on the page checks 706 for any cookie data in the browser of the associated user device. If a cookie is detected on the associated user device, an ad server, such as web server 126 (shown in FIG. 2) sends 708 the panelist ID of the associated user device to an ad exchange.

When an entity is operating 710 an ongoing ad research campaign, the ad exchange brings 712 publishers and advertisers together, and uses cookie information from web traffic to make a fair advertisement sale for both parties. The entity bids 714 for the opportunity to show panelists an advertisement in real-time in the ad space. When the bid is won, either a test advertisement or control advertisement is shown 716 to the panelist in the ad space. Accordingly, the panelist has been targeted 718 with the test or control advertisement. When the advertisement is shown 716, in the example embodiment, the panelist ID, the advertisement (test or control), and the timestamp (i.e., the time the advertisement was shown) are sent 720 to a database, such as database 120 (shown in FIG. 1). Accordingly, data can be generated for advertisements shown to multiple panelists. That data can be analyzed to determine how often advertisements were shown, which advertisements were effective, etc.

Figure 8:
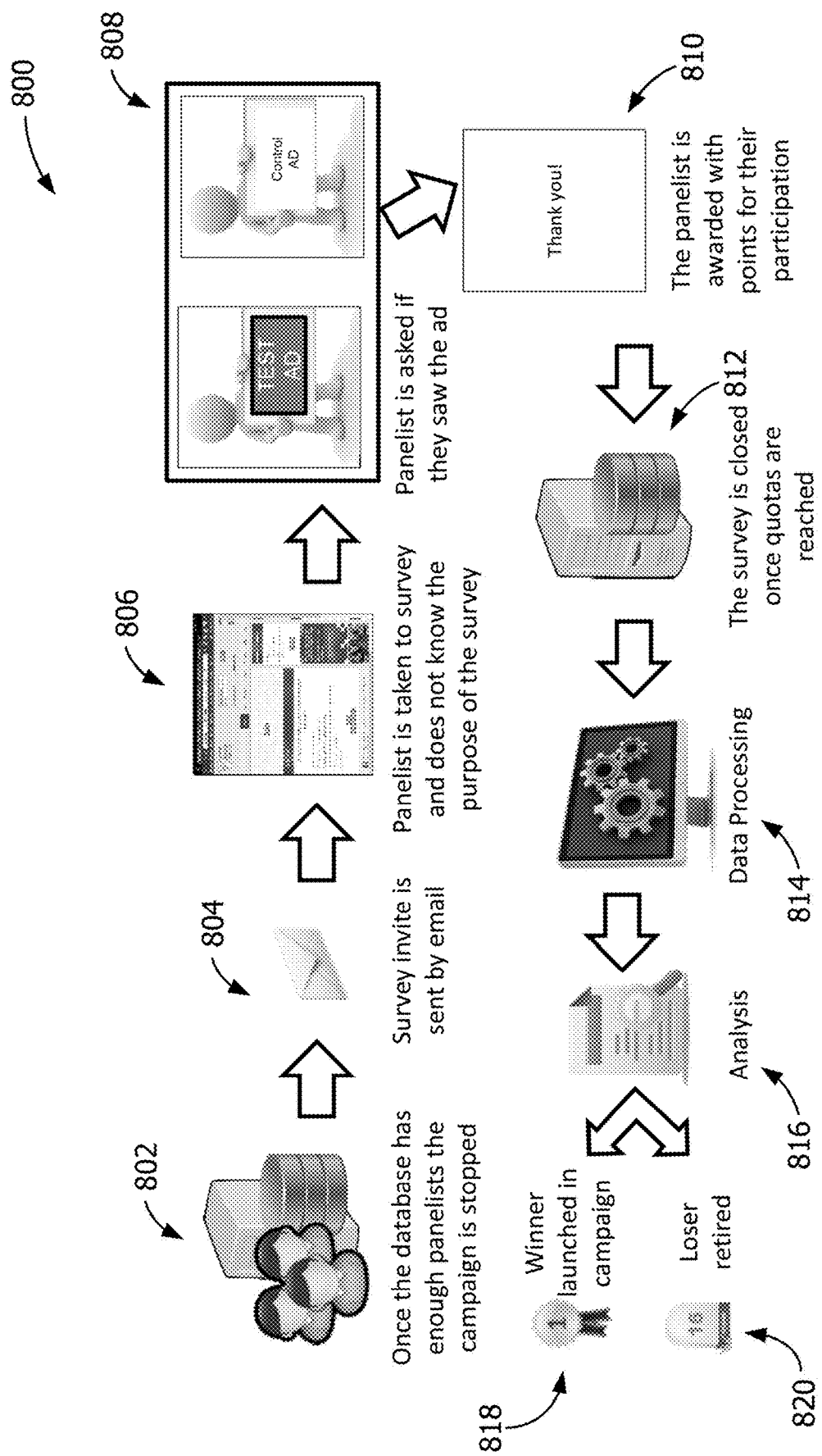

FIG. 8 is a flow diagram of an exemplary method 800 for surveying panelists after serving advertisements to the panelists. Once a sufficient number of panelists have been served with a test advertisement (with data being generated and stored for each advertisement being served), the test advertising campaign is stopped 802. A survey invite is sent 804 to panelists. The survey invite may be sent, for example, by email. When a panelist receives and opens the survey invite, the panelist is taken 806 to the survey (for example, by selecting a URL). In the example embodiment, the panelist does not know the purpose of the survey (i.e., the panelist does not know the survey concerns the test advertisements served to the panelist).

In the survey, the panelist is asked 808 whether they saw the test or control advertisement. The panelist may also be asked other questions regarding the test or control advertisements. For participating in the survey, the panelist is rewarded 810. For example, the panelist may be rewarded 810 with points that can be redeemed for merchandise or discounts. Once enough panelists have been surveyed, the survey is closed 812. Data processing and/or data mining are performed 814 on the survey results, and an analysis is performed 816 to determine trends, preferences, etc. in the survey results. Based on the results of the analysis, if the test advertisement was received favorably, it can be launched 818 in an ad campaign. On the other hand, if the test advertisement is not received favorably, it can be retired 820.

Using the systems and methods described herein, advertising research is conducted by controlling which panelists are exposed to test advertisements and which panelists are not exposed. After at least some of the panelists are exposed to the test advertisement, surveys are conducted to follow up with the panelists to measure the impact of the test advertisement. More specifically, ad servers, such as web server 126 (shown in FIG. 2) control ad exposure and target such exposures to individuals (i.e., panelists) that are relatively easily accessible and about whom at least some information (e.g., demographic information) is already known. As opposed to a random sample of unknown individuals, the panelists may be more likely to provide feedback (e.g., complete surveys). Further, the panelists may be selected for exposure to a particular test advertisement using the information already known about them.

There are two general categories of ad research—pre-testing and in-market evaluation. The systems and methods described herein can improve ad research in both categories.

In pre-testing, advertisers test ads prior to launching an ad campaign in order to estimate which ads are likely to be effective and to receive feedback that can be used to improve the ads. Subjects are invited to view ads (sometimes combined with content), and then asked questions about the ads. This is sometimes known as "lab testing" because, although attempts are made to make the experience natural, the subjects involved know that they are part of a research project and know the ads are being shown to them for their evaluation. There are several disadvantages to the lab testing approach: a) subjects know they are part of a test so results may not be accurate for simulating an actual ad campaign, b) it can be difficult to get a large number of subjects to consent to the time commitment needed for viewing ads in this type of environment, and c) exposure context and consumer mindset (both of which are characteristics difficult to replicate in a lab test) play a role in ad receptivity and recall. Accordingly, typical pre-testing does not does not provide the most accurate way to assess test advertisements.

However, using the system and methods described herein, ad exposure can be controlled while panelists are naturally using their mobile devices and/or personal computers (or in the future, watching ad-served enabled programming on a television). Thus, the panelists are in a natural mindset, and several of the issues associated with lab tests are removed. In addition, since the ads are seen while the panelists perform natural behaviors, the ads are seen in a natural context rather than a forced or fabricated context. Thus, the systems and methods described herein allow for the receptivity, recall, mindset, and context of naturally viewing advertisements to be replicated completely.

In-market evaluation refers to measuring the impact of advertisements during a campaign or after the ad campaign has been completed. There are two main methods for in-market evaluation that differ in whether the entity performing the research can control and identify who was exposed to the advertising and who was not. When ads are served digitally (e.g., on personal computers and/or mobile devices), the entity can choose to randomly serve a test advertisement to some subjects and not to others. Further, the ads can be tagged, as described herein, so that the entity can determine who was exposed to the test advertisement and who was not. However, issues may arise when attempting to re-contact subjects to determine the impact of the test advertisement.

There are two main re-contact methods typically used, and both have limitations that the systems and methods described herein overcome. The first method is called a web intercept. In this method, a relatively intrusive advertisement is served, typically soon after the test advertisement has been served. The intrusive advertisement includes a web intercept invitation and a message, such as "take a survey" or "tell us how you feel, take a short survey". A small subset of subjects exposed to the test advertisement will click on the web intercept invitation and take the survey. However, one disadvantage of this method is that the publisher (i.e., the business entity on which the web intercept invitation was served) often does not like the negative user experience created by such an interruption in content consumption. Further, little, if any, is known about the subjects who decide to take the online survey. Accordingly, it may be necessary to ask additional questions during the survey to determine information (e.g., age, gender, etc.) of the subject, increasing the length of the survey and reducing the likelihood that subjects will complete the survey.

The second method for re-contacting subjects exposed to digital advertising is to survey research panelists and, during the online survey, to check for the presence of ad exposure cookies on the computers of the research panelists to determine who was and was not exposed to the advertising. Then the survey results can be analyzed accordingly. However, this amounts to finding a needle in a haystack. For example, a typical digital ad campaign may reach 10% of people. That is, if a research panel includes 10,000 subjects, approximately 1,000 of them would be exposed to the advertisement. Assuming 10% of those panelists who view the advertisement decide to take the survey, the number of completed surveys will be on the order of 100. Typically, one needs more than this to conduct reliable research. Also, one often wants to analyze the results by age, gender and/or geography, thus making sample sizes even smaller.

When ads are not served digitally, it may not be possible to determine who was exposed to the test advertisement and who was not. However, the systems and methods described herein apply to advertisements that can be served digitally or advertisements for which digital ad serving provides an adequate way to assess the advertising. For example, advertisements normally seen on a television could be served via ad servers in the future. At present, video ads designed for television can be reformatted to be served naturally in a format known as "pre-roll video" on websites or mobile devices. Pre-roll videos are advertisements shown immediately before video content that has been selected by a user for viewing The systems and methods described herein avoid the disadvantages of at least some known ad research approaches. Interruptive web intercept invitation tactics are not used in the systems and methods described herein. Further, since selected panelists, rather than random website viewers, are used for the research, one need not ask about age, gender, etc. in the survey, as this information is already known about the panelists in the example embodiment. Moreover, since the systems and methods described herein involve directly targeting the panelist, a large percentage of the panelists will be exposed to the advertising and the overall number of panelists need not be as large as those employed in at least some known ad research methodologies.

The systems and methods described herein may be used to evaluate any type of test advertisement that can be served to individuals. This includes advertisements displayed on personal computers, mobile devices, and/or tablets. This also includes television advertisements that can be displayed as pre-roll video ads on such devices. Surveys and advertisement exposure can be designed to determine which advertisements perform best on particular websites and/or devices, and which advertisements perform best relative to certain demographics.

The systems and methods described herein provide an advertisement evaluation product for measuring the impact of any advertisement capable of being served to potential consumers. Results from the ad research conducted using the systems and methods described herein may be used to make adjustments to test advertisements and/or ad campaigns.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for conducting ad research using a plurality of selected panelists each having a user device and having demographic information that matches a target demographic for a test advertisement, said method comprising:
    embedding a first object in digital content viewable by the plurality of panelists, the first object transparent or matching a color of a background image in which the first object is embedded, the first object embedded in an email sent to the plurality of panelists;
    using the first object embedded in the email to place a cookie on a respective user device when each panelist views the digital content in the email by causing a web browser on the user device to request the cookie from a web server, the cookie enabling a server to identify the respective user device;
    embedding a second object in the test advertisement;
    storing the test advertisement with the embedded second object on the same web server that the cookie is requested from;
    serving the test advertisement to at least some of the plurality of panelists using the cookies;
    serving a control advertisement to at least some of the plurality of panelists using the cookies, the control advertisement served for experimental design purposes and not being the subject of the ad research, the test advertisement served to at least one of i) randomly selected panelists of the plurality of panelists and ii) a predetermined percentage of the plurality of panelists;
    generating data related to the serving of the test advertisement using the second object, the data including a time at which the test advertisement is served to a panelist of the plurality of panelists, a number of times the test advertisement is served to the panelist, and a website at which the test advertisement is served to the panelist;
    storing the generated data in a targeting database; and
    collecting ad effectiveness data from the plurality of panelists regarding the test advertisement by:
        embedding a third object in a landing page;
        sending an invite for a survey to each of the plurality of panelists, the invite including a URL that links to the landing page;
        placing a second cookie on a first panelist user device when the first panelist user device accesses the landing page, wherein a panelist ID unique to the first panelist user device is stored in the second cookie and also stored in the targeting database;
        receiving survey answers from the first panelist user device; and
        storing the survey answers in the targeting database, the survey answers stored in the targeting database in association with the panelist ID that is unique to the first panelist user device.

2. A method in accordance with claim 1, wherein demographic information includes at least one of an age, gender, occupation, and geographic location of an individual.

3. A method in accordance with claim 1, wherein embedding a first object comprises embedding a web bug.

4. A method in accordance with claim 1, wherein serving a test advertisement comprises:
    identifying, using the server, a user device based on the cookie placed on the user device; and
    serving the test advertisement from the server to the user device.

5. A method in accordance with claim 1, wherein generating data comprises tracking which of the plurality of panelists were served the test advertisement.

6. A method for conducting ad research, said method comprising:
    placing a cookie on a user device of a predetermined panelist of a plurality of selected panelists in response to the predetermined panelist viewing digital content that includes an embedded first object, the cookie requested from a web server, the first object transparent or matching a color of a background image in which the first object is embedded, the first object embedded in an email sent to the predetermined panelist, the plurality of panelists having agreed to participate in the ad research and selected based on demographic information such that demographic information of each panelist matches a target demographic for a test advertisement;
    serving the test advertisement to the predetermined panelist using the cookie, a second object embedded in the test advertisement, the test advertisement served from the web server that the cookie is requested from, the web server storing the test advertisement with the embedded second object;
    serving a control advertisement to at least some of the plurality of panelists using the cookie, the control advertisement served for experimental design purposes and not being the subject of the ad research, the test advertisement served to at least one of i) randomly selected panelists of the plurality of panelists and ii) a predetermined percentage of the plurality of panelists;
    generating data related to the serving of the test advertisement using the object, the data including a time at which the test advertisement is served to the predetermined panelist, a number of times the test advertisement is served to the predetermined panelist, and a website at which the test advertisement is served to the predetermined panelist;
    storing the generated data in a targeting database; and
    collecting ad effectiveness data from the predetermined panelist regarding the test advertisement by:
        embedding a third object in a landing page;
        sending an invite for a survey to the predetermined panelist, the invite including a URL that links to the landing page;
        placing a second cookie on the user device of the predetermined panelist when the user device accesses the landing page, wherein a panelist ID unique to the user device is stored in the second cookie and also stored in the targeting database;
        receiving survey answers from the user device; and
        storing the survey answers in the targeting database, the survey answers stored in the targeting database in association with the panelist ID that is unique to the user device.

7. A method in accordance with claim 6, wherein demographic information includes at least one of an age, gender, occupation, and geographic location of the predetermined panelist.

8. A method in accordance with claim 6, wherein serving a test advertisement comprises:
    identifying, using the web server, the user device based on the cookie placed on the user device.

9. A web server configured to:
    cause a first object to be embedded in digital content that will be viewed by a plurality of panelists, each panelist having a user device, each panelist having agreed to participate in ad research and selected based on demographic information such that each panelist has demographic information matching a target demographic for a test advertisement, the first object transparent or matching a color of a background image in which the first object is embedded, the first object embedded in an email sent to the plurality of panelists;

cause a cookie to be placed on a respective user device when each panelist views the digital content by causing a web browser on the respective user device to request the cookie from the web server;

identify the respective user devices using the cookies;

cause a second object to be embedded in test advertisement;

store the test advertisement with the embedded second object on the same web server that the cookie is requested from;

serve the test advertisement to at least some of the plurality of panelists using the cookies;

serve a control advertisement to at least some of the plurality of panelists using the cookies, the control advertisement served for experimental design purposes and not being the subject of ad research, the test advertisement served to at least one of i) randomly selected panelists of the plurality of panelists and ii) a predetermined percentage of the plurality of panelists;

generate data related to the serving of the test advertisement using the second object, the data including a time at which the test advertisement is served to a panelist of the plurality of panelists, a number of times the test advertisement is served to the panelist, and a website at which the test advertisement is served to the panelist; and cause the generated data to be stored in a targeting database.

10. A web server in accordance with claim 9, wherein to cause a first object to be embedded in digital content, said web server is configured to cause a web bug to be embedded in digital content.

11. A web server in accordance with claim 9, wherein to generate data, said web server is configured to track which of the plurality of panelists were served the test advertisement.

* * * * *